3,402,338
CONTROLLER FOR A DC OR UNIVERSAL MOTOR UTILIZING STATIC SWITCHING ELEMENTS
John C. Thoresen, Warwick, R.I., assignor to The New York Air Brake Company, a corporation of New Jersey
Filed Mar. 3, 1966, Ser. No. 531,502
10 Claims. (Cl. 318—310)

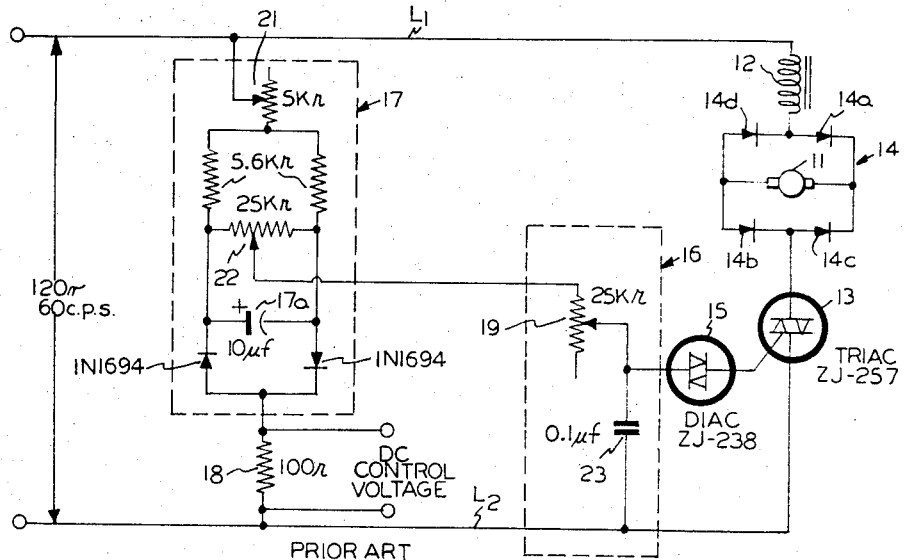
FIG.1 PRIOR ART
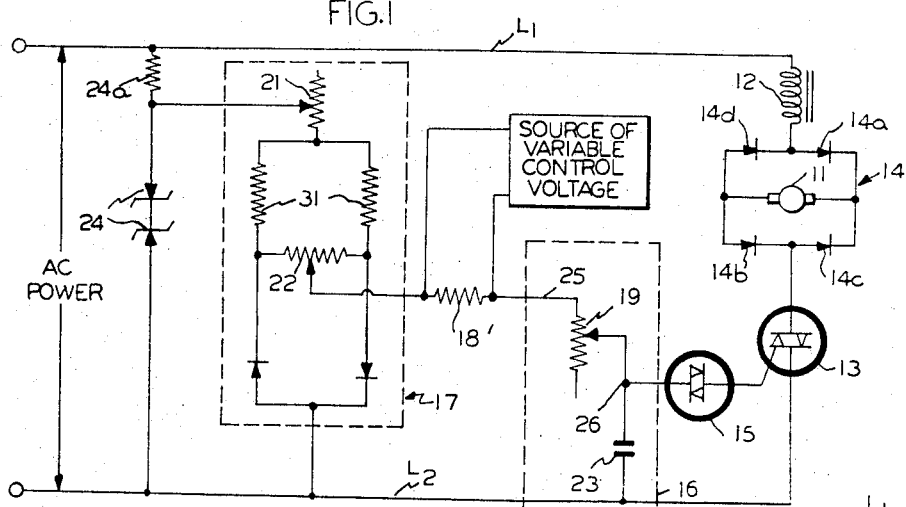
FIG.2
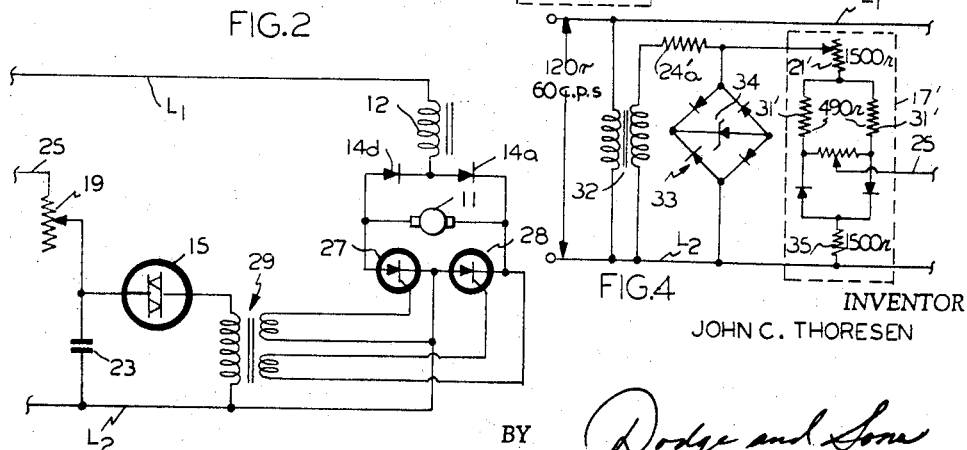
FIG.3
FIG.4
INVENTOR
JOHN C. THORESEN
BY Dodge and Sons
ATTORNEYS United States Patent Office 3,402,338
Patented Sept. 17, 1968

This invention relates to controllers for electric motors.

The object of the invention is to provide a low cost controller for a DC or universal motor which utilizes static switching elements and which is capable of varying motor speed in proportion to the magnitude of an applied control voltage.

The preferred and several alternative embodiments of the invention are described herein with reference to the accompanying drawing in which:

FIG. 1 is a circuit diagram of a known motor controller which forms the basis for the present invention.

FIG. 2 is a circuit diagram of one embodiment of the invention.

FIG. 3 is a circuit diagram showing an alternative power switching scheme for the embodiment of FIG. 2.

FIG. 4 is a circuit diagram illustrating the preferred scheme for generating and regulating the line-synchronized voltage supplied to the timing circuit.

The present invention concerns certain improvements in the motor controller shown in FIG. 1, and therefore it is necessary to consider first the nature and deficiencies of this known apparatus.

The controller illustrated in FIG. 1 is associated with a series motor whose armature 11 and field 12 are connected across a pair of AC power leads $L_1$ and $L_2$ in a circuit containing static, gate controlled power switching means, such as triac 13. One of the windings of the motor, in this case the armature 11, is connected across the output terminals of a bridge rectifier 14 so that as the polarity of the leads $L_1$ and $L_2$ changes so too does the relative direction of current flow through the winding. This arrangement permits reversal of the direction of rotation of the motor. The triac 13 is gated by a static, bidirectional triggering means in the form of a diac 15 which is fired in opposite directions by pulses from an R–C timing circuit 16. This circuit receives a line-synchronized voltage from a generator 17, which is connected across leads $L_1$ and $L_2$ in a circuit including input resistor 18, and whose output takes the form of a clipped sine wave.

The illustrated controller includes three potentiometers 19, 21 and 22 which are used to adjust its operating characteristics. Potentiometer 19, which defines the resistance portion of the R–C circuit 16, is a gain control. Potentiometer 21 is a deadband control which serves to vary the amplitude of the output voltage of generator 17. It is so adjusted that, in the absence of an input signal, this output voltage causes timing circuit 16 to fire diac 15 late in each positive and negative half cycle. As explained below, this causes the motor to dither, i.e., to tend to rotate in opposite directions on successive half cycles of the AC power. Potentiometer 22 normally serves as a balance control which is used to equalize the amplitudes of the positive and negative portions of the output voltage of generator 17. While each potentiometer is assigned a primary function, it will be understood that they interact to some degree.

When the FIG. 1 system is put in operation, leads $L_1$ and $L_2$ are connected with an AC power source, potentiometers 21 and 22 are adjusted as indicated above, and potentiometer 19 is set to give the desired gain. During the half cycle in which lead $L_1$ is positive relative to lead $L_2$, generator 17 supplies a positive pulse to timing circuit 16 which progressively increases the charge on capacitor 23. When the voltage across this capacitor reaches the breakover voltage of diac 15, the capacitor discharges a high current, short duration positive pulse into the gate circuit of triac 13 which renders the triac conductive in the direction of lead $L_2$. Current now will flow from lead $L_1$ to lead $L_2$ through field winding 12, blocking diode 14a, armature 11, blocking diode 14b, and triac 13. Since, in the absence of an input voltage across resistor 18, diac 15 fires very late in the half cycle, the duration of the current flow through the motor will be so short that the motor will just begin to rotate at the instant the polarity of the leads $L_1$ and $L_2$ changes.

During the negative half cycle, i.e., when lead $L_2$ is positive relative to lead $L_1$, generator 17 supplies a negative pulse to timing circuit 16 which causes capacitor 23 to charge negatively. When the voltage across the capacitor reaches the breakover value, diac 15 delivers a negative pulse to triac 13 which renders the triac conductive in the direction of lead $L_1$. Now, current flows from lead $L_2$ to lead $L_1$ through triac 13, blocking diode 14c, armature 11, blocking diode 14d, and field winding 12. As in the case of the positive half cycle, the diac 15 will fire late in the half cycle in the absence of an input signal, and the motor will just commence to rotate at the instant the polarity of the leads again changes. However, in this case the motor will tend to rotate in the opposite direction because the direction of current flow through the field has been reversed relatively to the direction of flow through the armature. This tendency of the motor to rotate in opposite directions during successive half cycles overcomes static friction, and will continue as long as no input signal is applied to the controller.

The motor can be rotated in one direction by applying a DC voltage across input resistor 18. Depending upon its polarity, this input voltage will reinforce the pulses of one polarity produced by generator 17 and cause timing circuit 16 to fire diac 15 early in the corresponding half cycle of the AC power supplied to the motor. Simultaneously, the input voltage will oppose the generated pulses of the opposite polarity and thereby preclude firing of the diac 15 on the other half cycle of the supply voltage. Since the motor now receives current pulses during only one half cycle, it will rotate continuously in one direction. Reversal of the direction of rotation is accomplished by changing the polarity of the DC input voltage.

While the speed of rotation of the motor can be changed by varying the magnitude of the DC input voltage, and thus varying the point in the active half cycle at which diac 15 fires, experience with the controller shows that it has inherently a very large deadband which precludes proportional control action. The controller illustrated in FIG. 1 is a good example of this. It is designed to accept a DC control voltage of ±6 volts, but has a total deadband of approximately 10 volts. This means that, in either direction of operation, the motor remains at rest as the voltage is increased from zero to five volts, and then accelerates to rated speed as the input is increased one more volt. This characteristic makes the controller unsatisfactory for use in most servo and other types of control systems and, contrary to what might be expected, the lack of proportionality cannot be remedied either by increasing the input current, which would be undesirable even if it cured the problem, or by increasing the value of input resistor 18.

In the interests of completeness, it should be mentioned that the speed and the direction of operation of the motor in FIG. 1 can also be varied by moving the wiper of balance potentiometer 22. Although this mode of operation does afford a proportional relationship between motor speed and the input signal, it limits the utility of the controller because of the necessity of providing a mechanical input to the potentiometer.

Experience with the prior controller of FIG. 1 also shows that its operation is adversely affected by the voltage fluctuations encountered in the usual 120 volt, 60 cycle power system. This is so because these voltage fluctuations change the output of generator 17, and thus cause timing circuit 16 to alter the firing angle of diac 15. As a result, it is impossible to control precisely the dithering action of the motor or to establish a certain fixed relationship between the magnitude of the input signal and the operation of the motor.

With the nature and deficiencies of the prior controller clearly in mind, the improvements provided by the present invention can be fully appreciated. The embodiment of the invention illustrated in FIG. 2 is identical to the FIG. 1 controller except for two important differences. The first involves the provision of a voltage regulator in the form of a pair of Zener diodes 24 and a current-limiting resistor 24a which are connected across leads $L_1$ and $L_2$, and which serve, within limits, to make the output voltage of generator 17 independent of the voltage fluctuations in the power lines. Since the regulator inherently clips or shapes the output wave from generator 17, it makes unnecessary the inclusion of the capacitor 17a which performs this function in the FIG. 1 controller. The second difference concerns the location of the point in the circuit at which the control voltage is introduced. In the improved controller, this voltage is injected directly into the timing circuit 16 by means of an input resistor 18' located in the lead 25 containing potentiometer 19 and connecting the wiper of balance potentiometer 22 with the junction 26. This change permits use of a much larger input resistor, for example, a resistor of 5,000 to 10,000 ohms in a controller using components having the values given in FIG. 1, and thereby makes possible establishment of a proportional relationship between motor speed and input voltage.

Various types of input signals can be applied to the resistor 18' in the improved reversible controller of FIG. 2, but in all cases the control voltage must have the effect of changing in reverse senses the amplitudes of the positive and negative portions of the wave supplied by generator 17. In cases where the balance potentiometer 22 is adjusted to cause the generator to supply a symmetrical signal, the motor can be controlled by a DC voltage of reversible polarity or by line-synchronized pulses whose polarity can be reversed. As the magnitude of the applied voltage is increased in one sense, timing circuit 16 fires diac 15 at progressively earlier points in the positive half cycles of the AC power and stops firing the diac altogether on the negative half cycles. As a result, the motor will run in one direction at a progressively increasing speed. When the magnitude of the input signal is increased in the opposite sense, diac 15 fires at progressively earlier points on the negative half cycles and does not fire at all on the positive half cycles. In this case, the motor rotates at a progressively increasing speed in the opposite direction.

If, on the other hand, balance potentiometer 22 is set to establish an asymmetrical output for generator 17, reversible operation can be realized without reversing the polarity of the input signal. In this case, the motor will remain at rest, or will dither, when the input voltage is at an intermediate value which equalizes the amplitudes of the positive and negative voltages supplied to timing circuit 16. As the input voltage is increased or decreased from this intermediate value, the firing angles of diac 15 on the positive and negative half cycles change progressively and in reverse senses, and therefore the motor accelerates in one or the other of its two directions of rotation.

Although a square wave is the ideal form for the output from generator 17 in a reversible controller, any wave form whose positive and negative portions are alike can be used. In the case of a unidirectional controller, the generator 17 can merely supply line-synchronized pulses of either positive or negative polarity. In this type of controller, the trigger 15 and the AC switch 13 need not be bidirectional, and the bridge rectifier 14 can be eliminated.

It also should be evident that, in the reversible embodiment, the diac can be replaced by other triggering means, such as the SBS (silicon bidirectional switch), and the triac can be replaced by a pair of back-to-back silicon controlled rectifiers which are gated from a pulse transformer. The last mentioned alternative is illustrated in FIG. 3, wherein it will be observed that the two silicon controlled rectifiers 27 and 28 are embodied in rectifier bridge 14 and thus eliminate two of the blocking diodes formerly employed in this circuit. The SCR's 27 and 28 are gated on the positive and negative half cycles, respectively, by pulses generated in the secondary windings of a pulse transformer 29. The primary winding of this transformer is connected in a circuit controlled by diac 15.

While the controllers of FIGS. 2 and 3 afford the desired proportional control action, they are inefficient and generate a considerable amount of heat. This is so because the generator 17 and the voltage regulator are operated at a voltage level much higher than the 28 to 36 volts required to fire diac 15, and because the voltage-reducing function is performed solely by resistances. The amount of power dissipated in this portion of the controller is so large that resistors 31 and 24a, Zener diodes 24, and deadband potentiometer 21 must have ten-watt power ratings. This disadvantage is eliminated in the preferred embodiment of FIG. 4, wherein a step-down transformer 32 is used to reduce the voltage applied to regulator 33 and generator 17' to about 60 volts. At this lower power level, heat sinks are not required, and regulation can be accomplished by a regulator 33 including a single, one-watt Zener diode 34 and a one-watt current-limiting resistor 24a'. In addition, the resistors 31' and the deadband potentiometer 21' in generator 17' now have lower values, and the power ratings of these components also can be reduced to one-watt. These changes result in a marked decrease in power consumption and heat generation, better voltage regulation, lower cost of manufacture, and a reduction in the physical size of the components. While the generator 17' does include an additional one-watt resistor 35, which serves to raise the output voltage to the level required for operation of diac 15, the inclusion of this part obviously does not offset to any appreciable extent the major advantages afforded by the FIG. 4 embodiment.

The improved controller of this invention is useful in any installation where it is desired to control either the speed of a continuously running motor or the position of an intermittently running motor. It is particularly useful to position the final control element in a servo control system requiring some form of proportional speed control action, such as proportional speed floating control action. In these position control systems, the power circuit of the motor should include limit switches which interrupt the flow of current through the motor when the final control element reaches the limit of its travel in either direction of movement.

As stated previously, the drawing and description relate only to several illustrative embodiments of the invention. Since changes, some of which have been mentioned, can be made in the structures of these embodiments without departing from the inventive concept, the following claims should provide the sole measure of the scope of the invention.

What I claim is:
1. A controller for a DC or universal motor including
 (a) an AC power source connected with the motor through static, gate-controlled power switching means;

(b) static triggering means for gating said switching means;

(c) a timing circuit for controlling the firing angle of the triggering means;

(d) a generator for supplying to said timing circuit voltage pulses which are in synchronism with the AC power;

(e) means for regulating the magnitude of the voltage pulses supplied to the timing circuit; and (f) control means for injecting directly into said timing circuit a variable control voltage which is superimposed on said voltage pulses and which causes the timing circuit to change the firing angle of the triggering means in direct proportion to its magnitude.

2. A controller as defined in claim 1 wherein (a) the connections between the AC source and the motor include a switching circuit for automatically reversing the relative direction of current flow through the field and armature of the motor on successive half cycles of the AC power;

(b) the static power switching means and the static triggering means are bidirectional;

(c) the generator supplies both positive and negative pulses to the timing circuit; and (d) the control means injects a control voltage which varies in opposite senses from an intermediate value at which the timing circuit causes the triggering means to fire late and at substantially the same point in both the positive and negative half cycles, variation of the control voltage in one sense causing the triggering means to fire progressively earlier and later on the positive and negative half cycles, respectively, and variation of the control voltage in the opposite sense causing the triggering means to fire progressively earlier and later on the negative and positive half cycles, respectively.

3. A controller as defined in claim 1 in which (a) the timing circuit includes a pair of leads connecting the triggering means with opposite sides of the generator, the first lead containing a resistance and the second containing a capacitor; and (b) the control means includes an input resistor located in said first lead.

4. A controller as defined in claim 2 in which (a) the timing circuit includes a pair of leads connecting the triggering means with opposite sides of the generator, the first lead containing a resistance and the second containing a capacitor; and (b) the control means includes an input resistor located in said first lead.

5. A controller as defined in claim 2 wherein (a) the switching circuit is a rectifier bridge; and (b) the static power switching means comprises a pair of gate-controlled rectifiers located in two of the arms of said bridge, and a pulse transformer whose primary is connected in circuit with the triggering means and which has two secondaries connected, respectively, to the gates of the two gate-controlled rectifiers.

6. A controller as defined in claim 1 wherein the generator and the means for regulating the voltage are connected with the source through a step-down transformer.

7. A controller as defined in claim 2 wherein the generator and the means for regulating the voltage are connected with the source through a step-down transformer.

8. A controller as defined in claim 3 wherein the generator and the means for regulating the voltage are connected with the source through a step-down transformer.

9. A controller as defined in claim 4 wherein the generator and the means for regulating the voltage are connected with the source through a step-down transformer.

10. A controller as defined in claim 5 wherein the generator and the means for regulating the voltage are connected with the source through a step-down transformer.

No references cited.

ORIS L. RADER, *Primary Examiner.*

J. BAKER, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,338                          September 17, 1968

John C. Thoresen

It is certified that error appears in the above identified patent and that said Letters Patent are hereby corrected as shown below:

In the heading to the printed specification, lines 4 and 5, "assignor to The New York Air Brake Company, a corporation of New Jersey" should read -- assignor to General Signal Corporation, a corporation of New York --.

Signed and sealed this 3rd day of February 1970.

(SEAL)
Attest:

Edward M. Fletcher, Jr.                      WILLIAM E. SCHUYLER, JR.

Attesting Officer                              Commissioner of Patents